(No Model.)
L. CLAIRMONT.
HAY FORK.
No. 266,429. Patented Oct. 24, 1882.
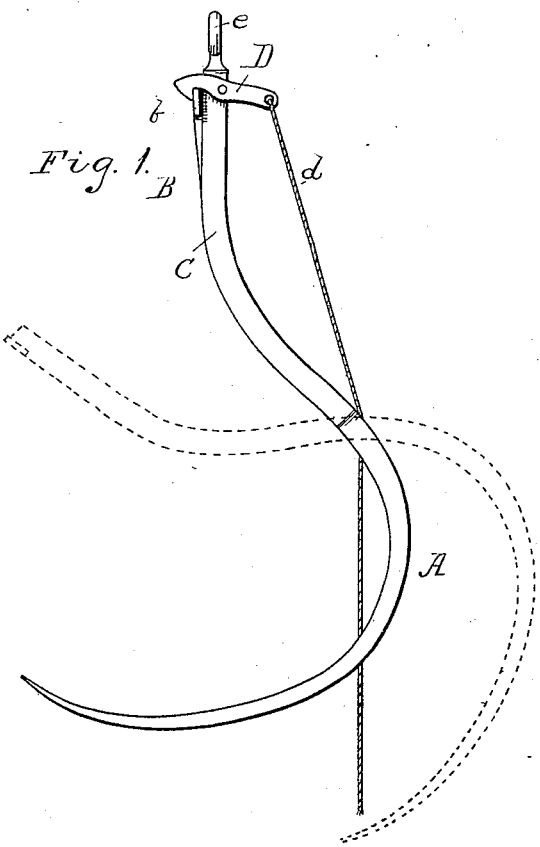
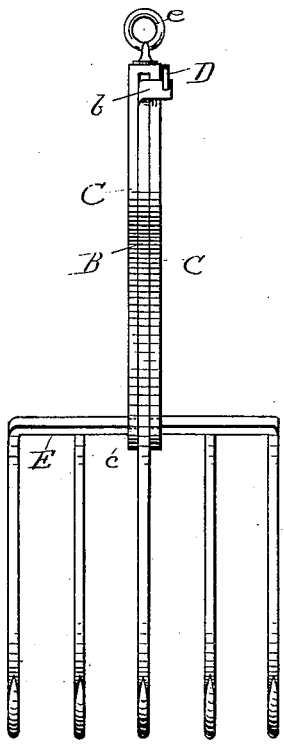
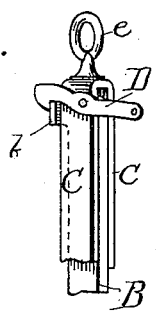
Witnesses:
F. D. Thomason
S. S. Schoff
Inventor:
Louis Clairmont
Coynes Co

UNITED STATES PATENT OFFICE.

LOUIS CLAIRMONT, OF OTTAWA, ILLINOIS, ASSIGNOR OF ONE-THIRD TO JAMES McMANUS, OF SAME PLACE.

HAY-FORK.

SPECIFICATION forming part of Letters Patent No. 266,429, dated October 24, 1882.

Application filed April 4, 1882. (No model.)

*To all whom it may concern:*

Be it known that I, LOUIS CLAIRMONT, of Ottawa, in the county of La Salle and State of Illinois, have invented certain new and useful Improvements in Hay-Forks; and I do hereby declare that the following is a full, clear, and exact description of the invention, which will enable others skilled in the art to which it appertains to make and use the same, reference being had to the accompanying drawings, and to letters of reference marked thereon, which form a part of this specification.

The object of my invention is to furnish a hay-fork for loading or unloading, which can be easily operated and made to discharge its load with little or no exertion.

It consists of a fork the stock or extension of which extends up into an open case corresponding in shape and dimensions to the same, near the lower end of which it is pivoted. The top of this extension is bent laterally, so as to form a finger which is engaged by a hook or dog pivoted near its center of length to the side of the case, and operated by a rope attached to its free end, substantially as described in the following specification and illustrated in the drawings, in which—

Figure 1 is a side view of my fork. Fig. 2 is a front view of the same, and Fig. 3 is a detached view of the dog and finger mechanism.

In the drawings, A represents a hay-fork of proper size, having an extension, B, the upper end of which is bent laterally, so as to form a finger, *b*. This fork and extension is pivoted at *c* between the two sides and near the lower ends of the case C, which corresponds in shape and dimensions to said extension, so as to present a smooth, even surface when inserted in the hay.

Pivoted to that side of the case, in the direction of which the finger *b* extends, at or near its center of length, and so as to engage said finger, is a hook or dog, D, perforated in its free end, so as to receive a hand-rope, *d*. When the dog D holds the finger the extension B is securely held within the case, which then presents a smooth, unbroken curvature. When the dog is raised by pressure on the free end of the same the finger is released and the weight of the hay on the fork will make it assume the position shown in dotted lines in Fig. 1, when it will empty it contents.

Secured to the top of the case is a ring, *e*, made to receive the elevator-rope, by means of which the whole is lifted or lowered.

If desired, a number of tines may be attached to a head, E, which, passing through the sides of the case, may be made to serve as a pivotal axis of the central hook and its extension, and, being rigidly connected thereto, will oscillate with the same.

What I claim as new, and desire to secure by Letters Patent, is—

A hay-fork in which the gravity of the load is utilized to operate the same, having a shank or extension of the fork adapted to shut within a case of corresponding shape and dimensions, said fork being fulcrumed in the lower end of the case, between the cheeks thereof, in combination with the tripping-hook pivoted to the outside of the case at its upper end, and engaging with the upper end of the shank or extension of the fork, bent to form a laterally-projecting finger, whereby the same is adapted to limit the inward movement of the shank and to receive the engaging-hook, substantially as set forth.

In testimony that I claim the foregoing as my own I hereby affix my signature in presence of two witnesses.

LOUIS CLAIRMONT.

Witnesses:
CHARLES H. HOOK,
FRANK THOMASON.